Oct. 10, 1950     T. C. BAKER     2,525,112
APPARATUS FOR AND METHOD OF TEMPERING GLASS ARTICLES
Filed Dec. 3, 1943     3 Sheets-Sheet 2

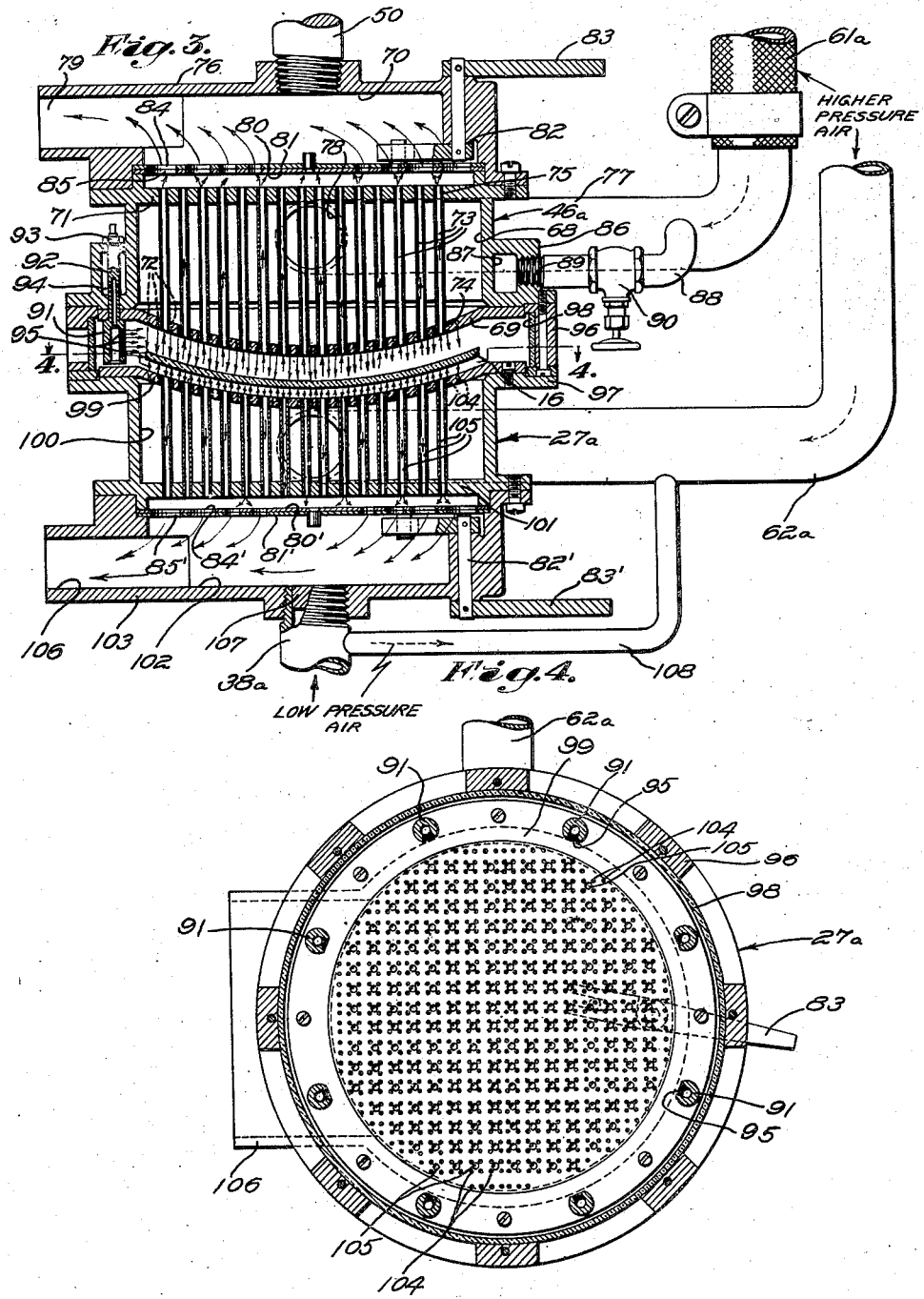

Patented Oct. 10, 1950

2,525,112

UNITED STATES PATENT OFFICE 2,525,112

APPARATUS FOR AND METHOD OF TEMPERING GLASS ARTICLES

Theodore C. Baker, Newington, Conn., assignor to Hartford-Empire Company, Hartford, Conn., a corporation of Delaware Application December 3, 1943, Serial No. 512,807

11 Claims. (Cl. 49—89)

This invention relates to improvements in apparatus for and methods of tempering glass articles, especially those such as lenses, mirrors and other articles which are generally plate-like and may be of concavo-convex shape.

In tempering glass articles, it is usual to bring the glass of an article to be tempered to a temperature at which substantially all strains therein will be relieved. This temperature, which may be termed the upper tempering temperature, may be at or slightly below the softening point of the glass. In tempering, the glass article is chilled or cooled rapidly, as by applying air to the entire surface thereof, to lower its temperature from the upper tempering temperature to a temperature below the strain point of the glass in such a way that the glass article, when cool, will have its surface layers in compression and its intermediate layers in tension.

A serious difficulty which has been encountered in attempts to temper plate-like glass articles, such as concavo-convex lenses, is that the shape of such an article is likely to be objectionably altered during the necessary handling and cooling thereof. This difficulty results in part from the shape of the article which is such that any portion of the article that is not directly supported is likely to sag or be distorted when the glass of the article has been heated to a temperature at or near its softening point. Such known instrumentalities as tongs, spaced rigid supporting elements, etc., therefore are not suitable for use to carry or support articles of the character described during the operations which are necessarily involved in tempering such articles. The difficulty is increased by the necessity of applying cooling fluid directly to the heated glass article throughout substantially the entire area of the surface portion thereof in which compressive strains are to be set up by the tempering operation.

An object of the present invention is to provide an apparatus for and a method of tempering articles of the character above described so as to overcome the above mentioned difficulty and to assure satisfactory tempering of such articles without causing or permitting any harmful change in the shape thereof.

The present invention provides a simple but effective means for supporting and moving a glass article of the character described so that it may be heated to the upper tempering temperature and then delivered to a supporting body of cooling fluid, all without affording an opportunity to the article harmfully to change its shape. The invention also provides efficient cooperative means for applying cooling fluid to the thus supported glass article throughout substantially its entire surface area to effect rapid cooling or chilling of the article.

Other objects and advantages of the present invention will hereinafter become obvious or will be pointed out in the following description of illustrative practical embodiments of the invention, as shown in the accompanying drawings, in which:

Fig. 3 is a fragmentary vertical sectional view of a second form of apparatus embodying the invention; and Fig. 4 is a horizontal section substantially along the line 4—4 of Fig. 3.

Figure 1:
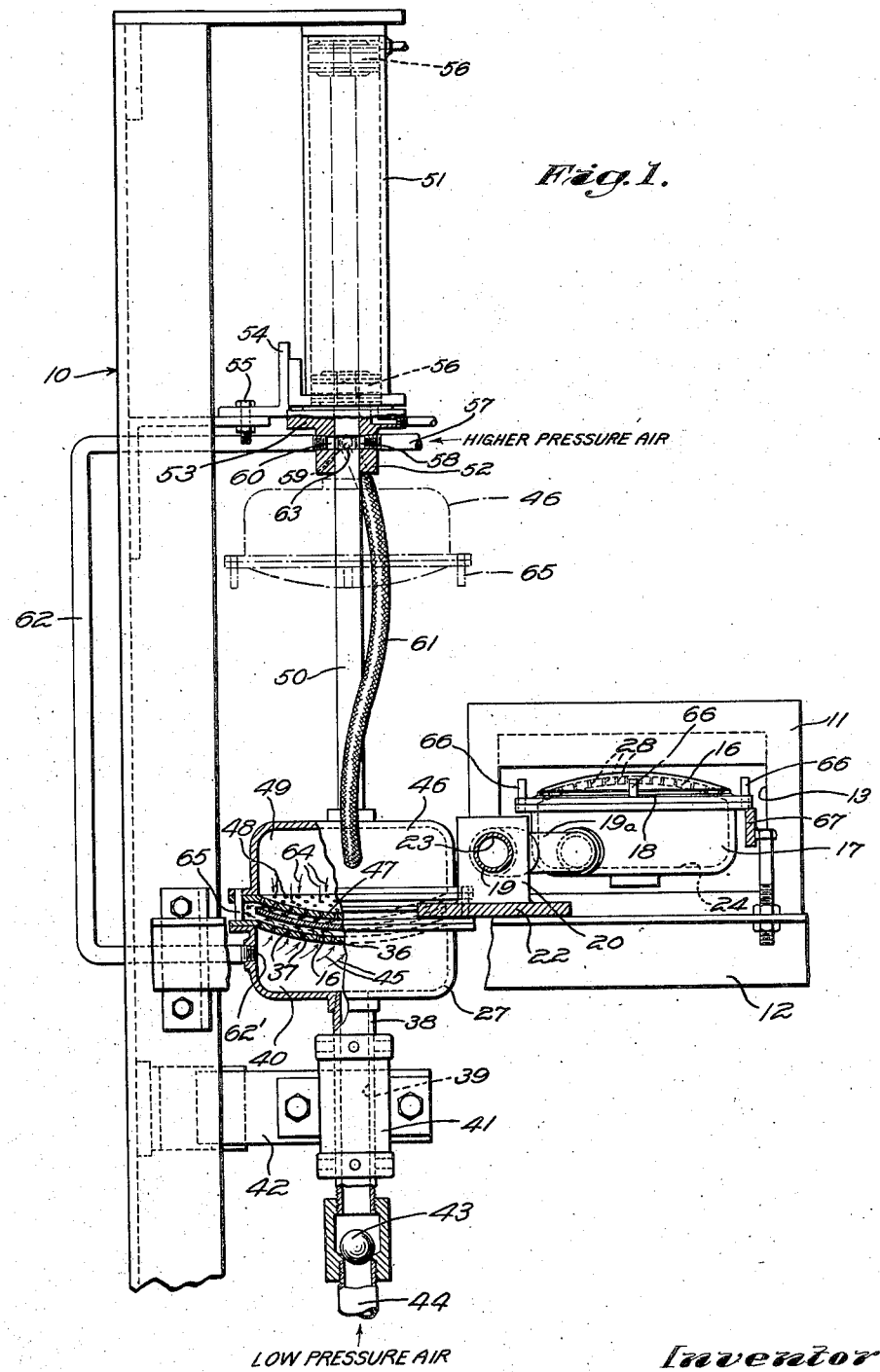
Figure 1 is a fragmentary view, mainly in elevation and partly in vertical section, showing the cooperative parts of one form of apparatus embodying the invention and particularly adapted for the tempering of a concavo-convex glass lens.
Figure 2:
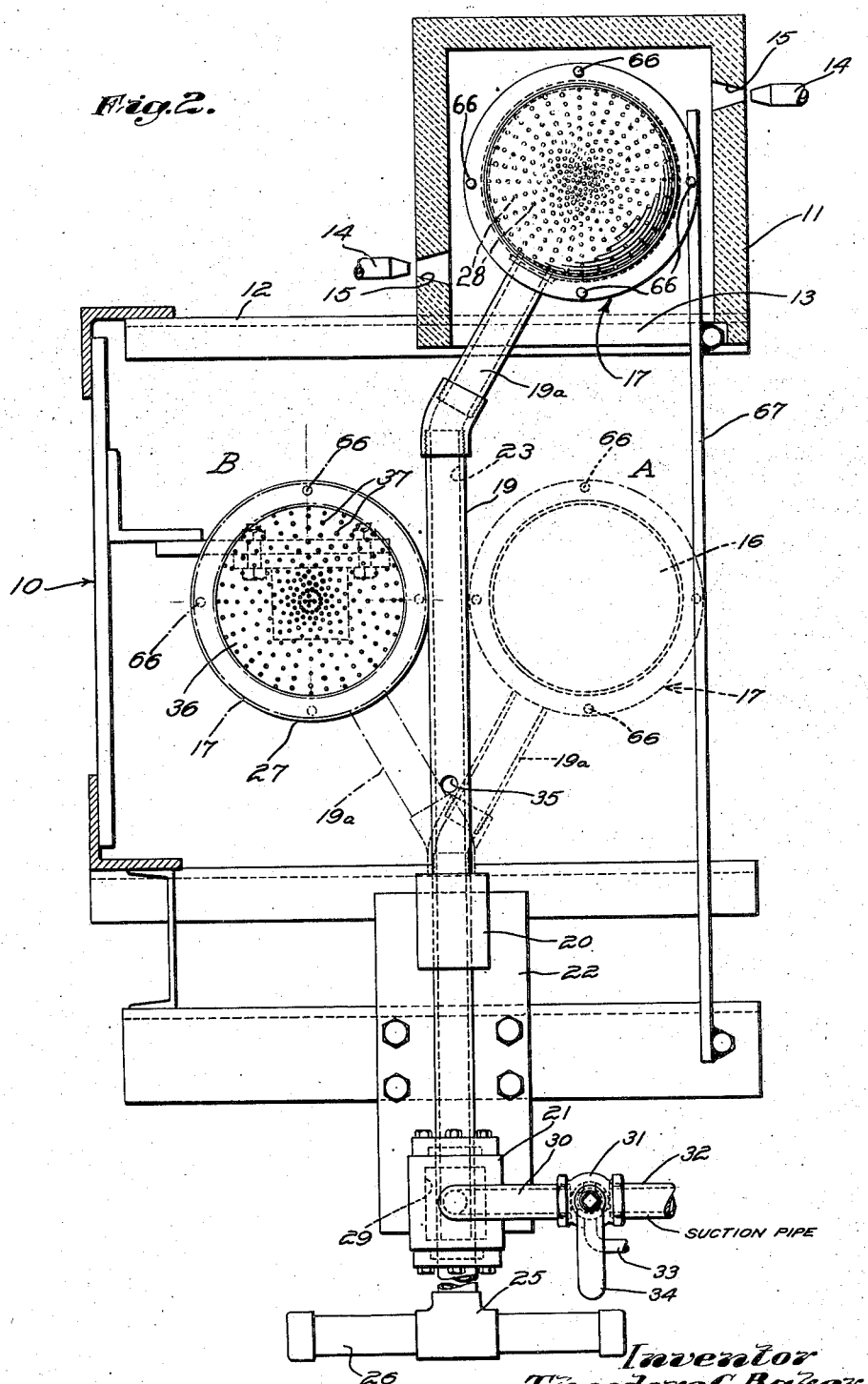
Fig. 2 is a view, mainly in plan and partly in horizontal section, of cooperative parts of the same form of apparatus, the view indicating three different positions which may be occupied successively by a movably mounted glass article supporting head which is included in such apparatus.

The apparatus shown in Figs. 1 and 2 may comprise a frame structure, generally indicated at 10. A heating furnace is shown more or less diagrammatically at 11 as being supported upon a horizontal member 12 of the frame structure at one side of the latter. The heating furnace has an opening 13 in the vertical wall thereof next to the frame structure, which may be termed the front of the furnace. Burners 14 are shown in Fig. 2 in association with burner ports 15 in the side walls of the furnace for heating the interior of the furnace. Obviously, any suitable means for or way of heating the furnace may be employed.

The apparatus shown has been designed for use to temper a concavo-convex glass lens or mirror, such as that indicated at 16 and best seen in Fig. 1. Such apparatus includes a movably mounted hollow glass article supporting head 17, the top wall 18 of which has been formed to be convexo-concave so that its upper surface will conform to the concave surface of the glass article 16 when the latter is disposed thereon, as shown in Fig. 1. In other words, the glass article supporting top surface of the head 17 will afford support for the glass article throughout substantially the entire then lower surface of the supported article.

The article carrying head 17 is carried by a shaft 19 which is supported in horizontally spaced aligned bearings 20 and 21, respectively, on a supporting plate 22 of the general frame structure 10, as shown in Fig. 2. The structural arrangement for supporting the shaft 19 is such that this shaft may be moved rectilinearly through the bearings 20 and 21 and also may be rotated about its axis in the bearings. The hollow head 17 is attached at one side thereof to an end of a laterally bent end portion 19a of the shaft 19. The shaft 19 may be hollow so as to be provided with a longitudinally extending bore 23 which is in open communication at one end with a chamber 24 within the hollow head 17. The bore 23 may be closed at its opposite end by a suitable pipe fitting, such as the tee 25, by which an operating handle 26 is attached to the shaft. The arrangement is such that an operator may grasp the handle 26 and slide the shaft 19 longitudinally through the bearings 20 and 21 to move the hollow head 17 from a position within the furnace 11, as shown in Fig. 2, in the dotted line position A in the same view. A horizontal rest bar 67 may be supported on the frame structure 10 in position to extend in parallel relation with the main, straight portion of the shaft 19 and into the furnace 11 beneath the rim of the hollow head 17 at the side of the latter remote from the shaft 19. The bar 67 serves to prevent downward swinging movement of the head 17 in a clockwise direction about the axis of the shaft 19 below a predetermined level at which the head 17 will be supported while within the furnace and while being retracted from the furnace to the position A. The hollow head preferably is disposed in a fully upright position when at this level, i. e., with all transverse axes thereof approximately horizontal.

The handle 26 may be manipulated by the operator to rotate the shaft 19 counter-clockwise about its axis through 180° to swing the hollow head 17 from the position A in Fig. 2 to position B in the same view. In this operation, the laterally bent end portion 19a of the shaft 19 functions as a crank arm on the shaft 19. The hollow article carrying head 17 will be disposed in an inverted position directly over an upwardly facing lower cooling fluid discharge head 27 (best seen in Fig. 1) when such head 17 has been brought in the manner described to its position B, Fig. 1.

The glass article 16 carried by the head 17 may be held firmly in place thereon by suction during the inversion of the head and until the time desired. To this end, the top 18 of the carrying head 17 is provided with numerous small apertures therein, as indicated at 28 in Fig. 1. The bearing structure 21 is formed to provide a chamber 29 surrounding the portion of the shaft 19 that is at any time located within that bearing. A pipe 30 is operatively connected at one end with the bearing structure 21 so as to communicate with the chamber 29. The pipe 30 is operatively connected at its opposite end by a valve 31 with a sub-atmospheric pressure pipe 32. The valve 31 may be a conventional two-way valve having an operative connection also with a super-atmospheric pressure pipe 33. The valve 31 is shown as having a handle 34, which may be turned manually, to establish communication between the pipe 30 and either pipe 32 or 33 at any given time and of course to shut off pressure from the other of such pressure pipes at that time. The hollow shaft 19 is provided with a port 35 in the wall thereof at a suitable location along the length of the shaft to be moved into the chamber 29 when the shaft 19 is retracted to withdraw the head 17 and the glass article thereon from the furnace to the retracted position A, Fig. 2. At this time, the pipe 30 may communicate through the valve 31 with the sub-atmospheric pressure supply pipe 32 so that sub-atmospheric pressure finally will be applied through the apertures 28 in the top of the carrying head 17 directly to the glass article thereon. The suction by which the glass article is held on the head 17 will be maintained when the shaft is rotated counter-clockwise through 180° from position A to position B, Fig. 2, to dispose the glass article over the upwardly facing cooling head 27.

The cooling head 27 preferably has its top 36 formed to be concavo-convex so that the upper surface of this top will conform to the curvature of the convex surface of the glass article 16. Numerous closely spaced jet holes 37 may be formed in the top 36. The head 27 may be supported on the upper end of a vertically disposed or upright hollow shaft 38, the bore of which, indicated at 39, is in open communication at its upper end with a chamber 40 which is formed within the head 27. The shaft 38 may extend downwardly through a suitable clamping mechanism, generally indicated at 41, by which the shaft may be attached to a supporting member 42 of the main frame structure 10. An upwardly opening check valve 43 of the ball valve type may connect the vertical shaft 38 at its lower end with a pipe 44 which may lead to any suitable source of pressure fluid supply. The pressure fluid supplied through the pipe 44 may be air under a relatively low pressure, as air from a blower fan (not shown). It will be obvious that the air thus supplied through the pipe 44 and the upwardly opening check valve 43 to the bore of the vertical shaft 38 will pass from the latter to the chamber 40 in the head 27 and thence through the jet holes 36 so as to provide a body of upwardly moving cooling air immediately above the cooling head 27.

The glass article 16 may be dropped from the carrying head 17 when the latter is at its position B, Fig. 2, onto this body of upwardly moving low pressure air and then be supported by the latter, above and out of contact with the top of the cooling head 27, substantially as shown in Fig. 1. The delivery of the glass article from the head 17 onto this supporting body of cooling air may be effected by relieving the suction on the article from the interior of the head 17. In order to assure immediate relief of this suction, I prefer to apply low pressure air briefly to the upper surface of the glass article at the time the suction is cut off. This may be accomplished by turning the handle 34 of the valve 31 to open communication between the super-atmospheric pressure pipe 33 and the pipe 30 and to close off the sub-atmospheric supply pipe 32. This suction-relieving and article-releasing structural arrangement and mode of operation may not be needed in some applications of the invention or for some articles. In some cases, the suction on the supported glass article will be satisfactorily relieved so that the article will fall instantly if the relief of suction is simply to the atmosphere. In such cases, the pipe 33 may be used simply as a vent to the atmosphere.

The invention also makes provision for discharging cooling fluid, such as air, from an upper movably mounted downwardly facing cooling fluid discharge head 46 downwardly onto the glass article while the latter floats upon the body of upwardly directed cooling fluid from the lower head 27. The head 46 preferably has its bottom wall 47 formed to be convexo-concave in shape with the convexly curved surface thereof facing downward and curved to conform to the curvature of the upper, concave surface of the glass article 16, Fig. 1. Numerous closely spaced apertures or jet holes 48 are provided in the bottom wall 47 of the head 46. This head is hollow and has a chamber 49 therein. A vertical piston rod 50 movably supports the head 46, being attached at its lower end to the top of the latter. The piston rod extends into a vertical cylinder 51 through a tubular valve casing 52 which may be formed as a downward extension from the lower head 53 of the cylinder. The cylinder 51 may be carried by a bracket structure 54 which is attached, as at 55, to a part of the main frame structure 10. The piston rod is attached at its upper end to a piston 56 which may be reciprocated vertically in the cylinder 51 in the usual manner.

When the piston 56 is at the upper end of its path of vertical reciprocatory movements in the cylinder 51, as shown in dot-and-dash lines in Fig. 1, the head 46 will be in a raised, out of the way, position as also indicated by dot-and-dash lines in the same view. This is the position of the head 46 while the glass article is being delivered to the supporting body of low pressure air from the lower head 27 and until the carrying head 17 has at least completed a sufficient part of its return movement from position B to position A, Fig. 2, to be out of the path of the descending upper cooling head 46.

A pressure fluid supply pipe 57 is operatively connected with an inlet port or lateral opening 58 in the tubular valve casing 52. This valve casing may be provided with outlet ports 59 and 60 at the same level. A flexible tube 61 connects the port 59 with the hollow upper cooling head 46 so as to communicate with the chamber 49 within the latter. A pipe 62 is operatively connected at one end with the port 60 and at its other end with a port 62' in the side wall of the lower upwardly facing head 27. The piston rod 50 is provided with an annular groove 63 which is suitably located along the length of such piston rod so that it will be located in communication with the ports 58, 59 and 60 when the piston 56 is at its lower position in the cylinder. At this time, the downwardly facing cooling fluid discharge head 46 will be in the position shown by the full lines in Fig. 1. At this position of the head 46, cooling fluid under pressure from the pipe 57 will enter the groove 63 around the piston rod, and thus be supplied to the flexible tubing 61 and the pipe 62. From the tubing 61, cooling fluid under pressure will enter the chamber 49 in the upper cooling head 46, from which it will be discharged through the jet holes 48 downwardly against the upper surface of the glass article 16 as shown by arrows 64 in Fig. 1. At the same time, cooling fluid under a like pressure will pass from the pipe 62 into the chamber 40 of the lower cooling fluid discharge head 27 and thence through the jet holes in the top of the latter upwardly in supporting and cooling relation with the glass article 16, as indicated by the arrows 45 in Fig. 1. This structural arrangement permits the use of cooling fluid, such as air, under a desirably higher pressure to effect rapid cooling or chilling of the glass article and at the same time permits use of cheaper, more readily obtainable low pressure air as an initial cooling fluid under-support for the glass article.

The jets of higher pressure cooling fluid passing upwardly through the jet holes 37 of the lower cooling head, as indicated by the arrows 45, will of course replace similarly moving jets of low pressure air from the hollow shaft 38 when the higher pressure air enters the chamber 40 and causes closing of the check valve 43. The low pressure air, which may be at a pressure as low as one-quarter of a pound per square inch, will afford adequate initial undersupport for the glass article without causing undesirably high lifting or upward bodily displacement of the article or too great a local cooling of the under surface portion of the article before downward jets of cooling fluid can be applied to the upper surface of the article. The pressure at which jets of higher pressure air will be applied in both upward and downward directions against the air-supported article may be selected or predetermined with a view to using the particular pressure which is most suitable to temper a particular article to the extent desired. Such higher pressure may be different for articles of different shapes, wall thicknesses, sizes, degree of temper desired, etc. I have used higher pressures in the order of five pounds per square inch to effect satisfactory tempering of glass lenses like that designated 16 in Fig. 1, making use of a structure substantially like that shown in this view and a procedure substantially as hereinbefore described.

The upper vertically movable head 46 may be provided with pins 65 which depend from the rim portion thereof at intervals around such rim for contact with the rim of the lower head to space the upper head suitably above the air-supported or floating glass article when the upper head is lowered to its cooling fluid discharge position. These pins also may serve as a guard or fence to prevent lateral displacement of the glass article from the space between the cooling heads should such a lateral movement of the article be initiated in any manner or for any cause during the cooling of such article.

The carrying head 17 may be provided with similar pins on its rim portion, these being indicated at 66, for contact with the rim of the lower cooling head 17 when the carrying head has been brought to its article delivery position B, Fig. 2.

The operation of the apparatus as thus described will be readily understood. The glass article to be tempered will be supported on the carrying head 17 throughout the entire area of a major surface of such article, as the concave surface of the lens 16, while such article is being heated within the furnace 11 and continuously thereafter during the retraction and subsequent movements of the carrying head until such article, in an inverted position, as with its convexly curved surface downward, is released from the inverted carrying head onto the article-supporting body of low pressure cooling fluid from the lower cooling fluid discharge head 27. The cooling of the article, while it is supported by a body of cooling fluid, is accomplished at the rapid rate desired, by the substitution of higher pressure cooling air for the low pressure air supplied by the lower cooling head and the concurrent application of similarly higher pressure air from the upper cooling head to the glass article. After the article has been thus rapidly cooled or chilled to the extent desired, the upper cooling head may be raised, thereby automatically shutting off the higher pressure air and turning on the low pressure air from the lower cooling head to again take over the support of the article until it is removed. The article may be removed in any suitable known way.

A second form of apparatus embodying the invention, as partially shown in Figs. 3 and 4, includes provisions for exhausting the spent cooling air from the space immediately surrounding the glass article being cooled through fluid exhaust or escape passages in the upper and lower cooling heads. The amounts of spent cooling fluid exhausted or permitted to escape through these passages in the cooling heads are regulable. Provision also is made to laterally confine the cooling fluid in the space between the upper and lower cooling heads when the upper cooling head is in its lowered or cooling position relative to the lower cooling head. Regulable amounts of cooling fluid may be discharged radially inward from the outer marginal part of the laterally confined space between the two cooling heads at a number of angularly spaced points around the vertical axial line of these heads. This will serve not only to aid the cooling of the edge portion of the article but will tend to stabilize the centered position of the fluidly supported article in the enclosed space between the opposed vertically spaced faces of the cooling heads.

The features above generally pointed out as being included in the form of apparatus which is partially shown in Figs. 3 and 4 will be understood by reference to these views. In Fig. 3, an upper cooling head, designated 46a, has been formed or constructed to provide a cooling fluid chamber 68 therein directly above the convexo-concave bottom plate 69 of such cooling head. This cooling head also has an exhaust or spent cooling fluid escape manifold chamber 70 in its upper portion, separated from the cooling fluid chamber 68 by a transverse wall or partition 71. The bottom plate 69 is provided with numerous spaced jet holes 72. Vertical fluid exhaust or escape tubes 73 extend through the cooling fluid chamber 68. The lower end portions of these tubes 73 fit within vertical openings 74 which are provided in the bottom plate 69 in spaced relation with one another and individually adjacent to the jet holes 72. The upper end portions of the tubes 73 fit in similar openings 75 in the partition wall 71. Communication thus is established through these tubes 73 between the space directly beneath the bottom plate 69 of the upper cooling head and the lower portion of the chamber 70 within the upper portion 76 of the cooling head. The upper cooling head may receive cooling fluid, specifically "higher pressure" air, from a supply line which may comprise a flexible tubing 61a like the tubing 61 of the Fig. 1 form of apparatus and a rigid pipe section or nipple 77 which is connected at its delivery end with an air intake port 78 in the side wall of the chamber 68 of the cooling head.

Regulation of the amount of spent cooling fluid permitted to pass through the chamber 70 to an outlet 79 for that chamber is effected by the use of a damper or register comprising a stationary apertured damper plate 80 extending transversely of the chamber 70 and a cooperative apertured rotary damper plate 81 mounted on the stationary plate 80. The rotary damper plate 81 may be rotated on the stationary plate 80 by a damper operating mechanism 82, which includes a pivoted operating handle 83, to bring apertures 84 in the rotary damper plate 81 more or less in register with similar apertures 85 in the stationary damper plate 80. The damper or register just described and its mode of operation are conventional and any other suitable known flow regulating device may be employed in lieu thereof.

The upper cooling head may be carried by the piston rod 50 of the Fig. 1 form of apparatus in lieu of the previously described upper cooling head 46. The supply of higher pressure air to the flexible tubing 61a may be controlled by the valve mechanism of the mechanism for lifting and lowering the upper cooling head, as in the case of the Fig. 1 form of apparatus.

The upper cooling head may be formed to provide a hollow annular portion 86 surrounding the wall of the cooling fluid chamber 68. An annular auxiliary cooling fluid chamber 87 is thus provided within the part 86. A branch line 88 leads from the pipe section 77 of the pressure fluid line to a lateral inlet port 89 in the outer wall of the part 86 so as to supply pressure fluid to the annular chamber 87. The amount of fluid passing through the member 88 to the chamber 87 may be regulated by a throttle or adjusting valve 90.

A series of short tubular nozzles 91 are supported beneath the rim portion of the bottom plate 69 of the upper cooling head in angularly spaced positions around that rim (see Fig. 4). These nozzles have stem portions 92 which extend through aligned openings in the bottom and top walls of the annular chamber 87 and each is retained in place, as by a nut 93 on the upper end portion thereof as shown for one of these nozzles in Fig. 3. The tubular nozzles 91 are closed at their upper and lower ends and each is provided with intake ports 94 in the stem portion thereof within the auxiliary annular chamber 87 and with inwardly directed lateral discharge apertures or jet holes 95 in the inner side wall thereof for discharging jets of air radially inward in the space immediately beneath the apertured discharge plate 69.

The upper cooling head is provided with a guard structure 96 depending from the peripheral portion of such head around the rim of the bottom plate 69 and below the level of the latter. This guard structure is adapted to seat at its lower edge upon the annular rim 97 of an upwardly facing lower cooling head 27a at the cooling station. The guard structure 96 includes an imperforate annular member 98, preferably made of a suitable transparent plastic material so as to permit observation therethrough of the space therewithin.

The lower cooling head 27a has a concavo-convex top plate 99, constituting the top wall of a cooling fluid chamber 100. The bottom wall 101 of the cooling fluid chamber 100 constitutes the top wall of a chamber 102 of an exhaust or spent cooling fluid escape manifold portion 103 of the lower cooling head. Jet holes 104 are formed in the top plate 99 of the lower cooling head. Vertical exhaust tubes 105 extend through the chamber 100 and have their upper and lower ends located in suitable aligned openings in the plate 99 and the wall 101, respectively, so as to provide communication between the space immediately above the top plate 99 and the upper portion of the exhaust manifold chamber 102. The relation of the bore of each tube 105 to adjacent jet holes 104 may be as shown to advantage in Fig. 4.

Cooling fluid, specifically "higher pressure" air, may be supplied to the chamber 100 from a pipe 62a which corresponds to the pipe 62 of the Fig. 1 form of apparatus. A damper or register and its operating mechanism, 80' to 85', inclusive, Fig. 3, as previously described for the upper cooling head, also may be provided for regulating flow of spent cooling fluid through the manifold chamber 102 of the lower cooling head. The manifold chamber 102 is provided with an outlet 106.

The lower cooling head may be supported on an upright tubular member 38a, corresponding to the tubular member 38 of the Fig. 1 form of device. However, in view of the different air supply provisions of the lower cooling head of the Fig. 3 form of construction, the bore of the tubular member 38a is closed at its upper end, as by a plug 107, and a branch line 108 is provided between the tubular member 38a and the pipe 62a for supplying low pressure air to the latter and thence to the chamber 100 within the lower cooling head.

The operation of the form of apparatus shown in Figs. 3 and 4 will be readily understood. One of the glass articles 16 is shown floating upon a body or cushion of cooling fluid in the laterally enclosed space between the top plate 99 of the lower cooling head and the bottom plate 69 of the upper cooling head. This glass article is being cooled by higher pressure air jets from the cooling heads. The spent cooling fluid is exhausted or removed through the vertical exhaust tubes in the cooling heads. The outlets 79 and 106 obviously may be connected operatively with any suitable known means (none shown) to lower the pressure therein if desired. Regulated amounts of cooling fluid are supplied to the auxiliary nozzles 91 so that jets of cooling fluid are discharged from these nozzles radially inward and against the edge of the floating glass article. This will tend to maintain the fluidly supported glass article in a centered position in the space between the cooling heads and may also aid in cooling at least the edge portion of the glass article.

Other glass articles than the concavo-convex lens shown in the drawings may be tempered by use of the illustrative embodiments of the invention shown in the drawings and hereinbefore particularly described. Also, these illustrative embodiments may be changed and modified in many particulars which will readily occur to those skilled in the art and which are within the purview of my invention.

I claim:

1. Apparatus for tempering glass articles comprising a hollow lower cooling head having numerous, closely spaced fluid discharge apertures in its top distributed through the major portion of the area thereof, a hollow upper cooling head having fluid discharge apertures in its bottom, means for supplying cooling fluid at a relatively low pressure to said lower cooling head to discharge jets of low pressure cooling fluid upwardly therefrom so as to constitute a fluid undersupport for each hot glass article placed thereon, means for positioning said upper cooling head in an operative cooling relation to the thus supported hot glass article, means for supplying cooling fluid under pressure to said upper cooling head to discharge jets of cooling fluid downwardly onto said article, and means constructed and arranged to be active only when said upper cooling head is in its said operative cooling relation to the glass article and then to supply cooling fluid to said lower cooling head at a pressure higher than that of said first named cooling fluid.

2. Apparatus for tempering glass articles comprising a lower cooling head having numerous, closely spaced jet holes distributed throughout the major portion of its top for discharging cooling fluid in an upward direction, an upper cooling head for discharging cooling fluid in a downward direction, means for supplying low pressure cooling fluid to the lower cooling head, means for placing a hot glass article upon the upwardly directed cooling fluid from the lower cooling head, means for positioning said upper cooling head in position to discharge cooling fluid downwardly onto the hot glass article on said upwardly directed cooling fluid, means constructed and arranged to supply a higher pressure cooling fluid to said lower cooling head only when said upper cooling head is in its said position, and means for concurrently supplying a counterbalancing pressure fluid to said upper cooling head.

3. Apparatus for tempering glass articles comprising a hollow lower cooling head having numerous, closely spaced fluid discharge apertures in its top throughout the major portion of the area thereof, a hollow upper cooling head having fluid discharge apertures in its bottom, means for supporting said heads and for moving one relative to the other so that the upper head is located at one time in a position spaced above and adjacent to the lower head and at another time in a position more remote from the lower head, means for supplying low pressure cooling fluid to said lower cooling head when said upper cooling head is at said remote position, and means constructed and arranged to supply higher pressure cooling fluid to both said heads only when the upper head is in its first named position.

4. Apparatus for tempering glass articles comprising means having a relatively fixed position for discharging cooling fluid upwardly so as to provide a fluid undersupport for a hot glass article to be tempered, means for discharging cooling fluid downwardly onto said article, and means operatively connecting said first and said second named means automatically to increase discharge of cooling fluid from the first means concurrently with discharge of cooling fluid from the second means.

5. Apparatus for tempering glassware comprising a hollow, stationary, lower cooling head having discharge apertures in its top, a vertically movable, hollow, upper cooling head having discharge apertures in its bottom, means for reciprocating said upper cooling head vertically between a lower, cooling position, spaced above the lower cooling head and adjacent thereto and a raised, inactive position more remote from the lower cooling head, a low pressure fluid line operatively connected with the lower cooling head, a higher pressure cooling fluid line also operatively connected with the lower cooling head, a pressure fluid line operatively connected with the upper cooling head, means controlling flow of pressure fluid through said higher pressure fluid line for the lower cooling head and through the pressure fluid line for the upper cooling head automatically to supply pressure fluid through these lines to the respective heads only when the upper cooling head is in its lower, cooling position, means controlling the low pressure fluid line for the lower cooling head to cause delivery of low pressure cooling fluid to the lower cooling head when the upper cooling head is raised, and means for delivering a hot glass article to be tempered onto the cooling fluid discharging from said lower head when said upper cooling head is in its raised position.

6. Apparatus for tempering glassware comprising a stationary lower cooling head, said cooling head having a pressure fluid chamber therein provided with an apertured wall at the top of said head, a vertically movable upper cooling head having a pressure fluid chamber therein provided with an apertured wall at the bottom of the head, means for reciprocating said upper cooling head vertically between a lower, cooling position adjacent to the lower cooling head and a raised, more remote position, means for supplying low pressure cooling fluid to the pressure fluid chamber of the lower cooling head, means providing fluid exhaust passages having end portions opening through the apertured wall of the lower cooling head adjacent to the apertures therein, means providing fluid exhaust passages having end portions opening through the apertured wall of the upper cooling head adjacent to the apertures therein, means for supplying higher pressure cooling fluid to the pressure fluid chambers of said heads when said upper head is in its lower, cooling position, an annular imperforate wall interposed between the peripheral portions of said heads when the upper cooling head is at its lower, cooling position, a plurality of angularly spaced nozzles depending within said imperforate wall and having fluid discharge apertures at their inner sides for directing pressure fluid inward in the space between said heads when the upper cooling head is in its lower, cooling position, and means for supplying cooling fluid under pressure to said nozzles.

7. Apparatus for tempering concavo-convex glass articles comprising a stationary, hollow, lower cooling head having a concavo-convex top wall provided with numerous, closely spaced discharge apertures distributed throughout the major portion of its area, a cooperative vertically movable hollow cooling head having a convexo-concave bottom wall provided with discharge apertures therein, means for reciprocating said upper cooling head vertically between a lower, cooling position spaced above and adjacent to the stationary cooling head and a raised, more remote position, means for supplying cooling fluid under pressure to the lower cooling head to discharge upwardly therefrom jets of cooling fluid adequate to support a concavo-convex glass article thereon above and out of contact with the top of the stationary cooling head, means for placing such an article when it has been heated to an upper tempering temperature upon said jets when the upper cooling head is in its raised position, and means for supplying cooling fluid under pressure to the upper cooling head when the latter is in its lower, cooling position and for simultaneously increasing the cooling effect of the pressure fluid supplied to the lower cooling head.

8. Apparatus for tempering glass articles comprising a cooling head having a top apertured to discharge cooling fluid under pressure upwardly therefrom to provide a fluid undersupport for each such article, means to supply cooling fluid under pressure to said cooling head, means for supporting each such article in a heated environment for heating said article to an upper tempering temperature, for removing the article from the heated environment and for delivering it in a heated condition onto said fluid undersupport, means for applying downwardly directed cooling fluid under pressure onto the thus supported article, and means operatively connected with said last named means for concurrently increasing the pressure of the cooling fluid discharging upwardly from said cooling head.

9. Apparatus for tempering glass articles of a platelike character which comprises a hollow cooling head having a top portion apertured to discharge cooling fluid under pressure upwardly therefrom to provide a fluid undersupport for each such article when the article has been delivered thereto, means to supply cooling fluid under pressure to said cooling head, a carrying head having a top surface formed to support said article throughout substantially the entire area of the then lower surface of the article, means for operating said carrying head to move it with the glass article thereon into a heated environment for the heating of the article to an upper tempering temperature, to then remove the article from the heated environment and to present it in an inverted position at a delivery position above said fluid undersupport, means for creating suction between the glass article and the supporting top surface of said carrying head to hold the inverted article at said delivery position temporarily against the carrying head, and means for relieving such suction to cause downward delivery of said article onto said fluid undersupport.

10. Apparatus for cooling a concavo-convex glass lens, or the like, which comprises a hollow cooling head having a top portion apertured to discharge cooling fluid under pressure upwardly therefrom to provide a fluid undersupport for each such article delivered thereto so as to support the article above and out of contact with the cooling head, means to supply cooling fluid under pressure to said cooling head, a carrying head having a convexly curved top surface conforming substantially to the shape of the concave surface of the glass article, the top of said carrying head having apertures formed therein, means for operating said carrying head to move it, with the glass article thereon, into a heated environment for heating the glass article to its upper tempering temperature, to then withdraw the carrying head and the glass article thereon from the heated environment and to present the glass article in an inverted position at a delivery position over the cooling head, means for applying subatmospheric pressure to the apertures in the top of the carrying head to hold the article to said carrying head when the latter is being moved to present the article in said inverted position over the cooling head and for then relieving said subatmospheric pressure to cause delivery of the inverted glass article downwardly onto said fluid undersupport, an upper cooling head movable vertically from a higher, inactive position downwardly to a cooling position immediately above the glass article on said fluid undersupport, said upper cooling head having discharge apertures in its bottom portion, and means for supplying cooling fluid under pressure to said upper cooling head when the latter is in its said cooling position and for simultaneously supplying higher pressure cooling fluid to the fluid undersupport for said article.

11. The method of tempering a concavo-convex glass lens which comprises heating said lens while it is resting with its concave surface downward upon a support having a glass contact surface convexly curved to conform to the curvature of the concave surface of the lens, inverting said support with the lens thereon and applying a suction to the concave surface of the lens to hold it in inverted position against the inverted support, presenting the inverted support with the lens held thereto over a fluid undersupport, relieving the suction to cause the lens to be delivered downwardly onto the fluid undersupport, and applying cooling fluid to the entire surface of the lens while it is resting on said fluid undersupport to cool it rapidly to a temperature below the strain point of the glass thereof.

THEODORE C. BAKER.

REFERENCES CITED

The following references are of record in the file of this patent:

UNITED STATES PATENTS

| Number | Name | Date |
|---|---|---|
| Re. 22,392 | Berthold | Nov. 16, 1943 |
| 1,107,072 | Houze | Aug. 11, 1914 |
| 1,483,461 | Littleton | Feb. 12, 1924 |
| 1,911,119 | Ingle | May 23, 1933 |
| 1,943,483 | Miller | Jan. 16, 1934 |
| 1,971,268 | Long | Aug. 21, 1934 |
| 2,182,167 | Berthold | Dec. 5, 1939 |
| 2,244,715 | Long | June 10, 1941 |
| 2,254,227 | Lewis | Sept. 2, 1941 |
| 2,298,709 | Long | Oct. 13, 1942 |
| 2,299,488 | Morehead | Oct. 20, 1942 |
| 2,375,944 | Quentin | May 15, 1945 |
| 2,376,872 | Harris | Oct. 20, 1942 |

FOREIGN PATENTS

| Number | Country | Date |
|---|---|---|
| 180,627 | Switzerland | Feb. 1, 1936 |
| 374,075 | Italy | Aug. 11, 1939 |
| 477,156 | Great Britain | Dec. 22, 1937 |
| 478,811 | Great Britain | Jan. 25, 1938 |
| 616,445 | Germany | July 18, 1933 |
| 680,578 | France | Jan. 22, 1930 |
| 806,220 | France | Sept. 21, 1936 |
| 829,655 | France | Apr. 11, 1938 |
| 833,559 | France | July 25, 1938 |